United States Patent [19]

Ventre

[11] 4,035,231

[45] July 12, 1977

[54] EMERGENCY COOLING DEVICE FOR A NUCLEAR REACTOR

[75] Inventor: Edmond Ventre, Le Vesinet, France

[73] Assignee: Electricite de France (Service National), Paris, France

[21] Appl. No.: 556,183

[22] Filed: Mar. 6, 1975

[30] Foreign Application Priority Data

Mar. 12, 1974 France .................... 74.08375

[51] Int. Cl.² .................................... G21C 9/00
[52] U.S. Cl. ................................ 176/38; 176/65
[58] Field of Search .............. 176/37, 38, 87, 65, 176/60, 28, 40; 60/486, 421, 375, 405; 417/426, 62

[56] References Cited

U.S. PATENT DOCUMENTS

| | | | |
|---|---|---|---|
| 3,008,889 | 11/1961 | Junkins | 204/193.2 |
| 3,507,747 | 4/1970 | Strohmeyer | 176/51 |
| 3,578,563 | 5/1971 | Strohmeyer | 176/51 |
| 3,601,986 | 8/1971 | Becker | 60/52 US |
| 3,839,150 | 10/1974 | Porter | 176/51 |
| 3,847,733 | 11/1974 | Ventre | 176/28 |
| 3,888,731 | 6/1975 | Finch et al. | 176/50 |
| T921,015 | 4/1974 | Redding | 176/38 |

FOREIGN PATENT DOCUMENTS 1,286,629  8/1972  United Kingdom ............. 176/61

Primary Examiner—Stephen C. Bentley
Assistant Examiner—Ralph Palo
Attorney, Agent, or Firm—McNenny, Pearne, Gordon, Gail, Dickinson & Schiller

[57] ABSTRACT

An emergency cooling device for a nuclear reactor in which the core is constituted by N independent modules and a heat-transporting fluid is circulated within each module $M_i$ under the action of a pump $P_i$ essentially comprises a manifold C and N pipes $S_i$ ($i = 1, 2 \ldots N$), each pipe $S_i$ being connected between the manifold C and a pipe $K_i$ which provides a connection between the pump $P_i$ and the module $M_i$.

3 Claims, 4 Drawing Figures

EMERGENCY COOLING DEVICE FOR A NUCLEAR REACTOR

This invention relates to a device for the emergency cooling of a nuclear reactor in which the core is constituted by N independent modules, each module being cooled by a heat-transporting fluid under the action of a pump assigned to each module.

The primary circuits of the nuclear reactor blocks all have the same hydraulic arrangement: a heat-transporting fluid circulates continuously between the reactor core in which the fluid undergoes a temperature rise and a heat exchanger in which said fluid releases its heat. Fluid circulation is carried out by a pump or a blower, depending on the nature of the fluid. This circulation function is performed by means of redundant safety devices in order to guarantee cooling of the reactor under all circumstances. In fact, the residual reactor power dictates the need for continuous cooling even when the reactor is shut down and when the safety rods are inserted to the full extent. However, the rate of flow of fluid which is necessary in order to extract this residual heat flux is of the order of only one percent of the nominal flow rate since the residual power is 1% of the nominal power approximately one minute after reactor shutdown.

Many nuclear reactor cores are formed by a certain number of modules supplied in parallel with heat-transporting fluid. One example of a reactor of this type will be found in U.S. Pat. No. 3,847,733 filed July 13, 1971, the entirety of which is incorporated by reference herein. This reactor further comprises a heat exchanger which is attached to each module and to which the device according to the invention as described hereinafter applies in a remarkable manner.

In the event of failure of the main pumps employed for circulating the heat-transporting fluid, it is essential to maintain a certain circulation of the fluid within the reactor core after shutdown in order to prevent excessive overheating caused by the residual power of the reactor. Devices designed for this purpose have been described in the prior art but all comprise active systems including mechanical pumping elements such as auxiliary pumps which are in turn liable to fail, thereby reducing reliability and safety of the reactor.

In the case of a modular reactor block constituted by N identical fluid circuits operating in parallel, the cooling function of the reactor can be ensured with a high degree of reliability as will become apparent hereinafter, by reason of the redundancy of the means provided by these modular loops and the automatic design of the emergency system.

The present invention is directed to an emergency cooling device for a nuclear reactor core constituted by N independent modules. This device provides a very high degree of reliability and operates automatically in the event of failure of a pump associated with a module of the reactor core (without intervention of any mechanical unit such as a pump or auxiliary blower), said device being intended to circulate a fluid at a sufficient rate of flow to ensure removal of the residual power of the reactor module.

In accordance with the invention, since a heat-transporting fluid is circulated under the action of a pump $P_i$ through each module $M_i$ ($i = 1, 2 \ldots N$) of the reactor core, the device comprises a manifold C and N pipes $S_i$ ($i = 1, 2 \ldots N$), each pipe $S_i$ being connected between the manifold C and the pipe $K_i$ which connects the pump $P_i$ to the module $M_i$.

The cross-sectional area of the pipes such as $S_i$ is advantageously within the range of 1/100 and 1/10 of the cross-sectional area of the main pipes $K_i$.

The operation of the device is as follows: a manifold C connects all the modular fluid circuits by means of a branch pipe $S_i$ placed in each circuit; if one of the modules $M_i$ has a failure of the associated pump $P_i$, there is a control-rod drop and therefore a reactor shutdown accompanied by a pressure drop at the point located between the pump $P_i$ and the reactor since the pump $P_i$ is no longer in operation. Since the different branch pipes are connected to the manifold at points at which the other pumps (other than the pump $P_i$) are in operation, the pressure of the fluid within the manifold is of high value and heat-transporting fluid is transferred to the module $M_i$ in which the pressure drop has taken place as a result of stoppage of the pump $P_i$. In consequence, sodium for example in the case of a fast reactor is withdrawn from the manfold and passed into the module of the reactor at the time of shutdown in order to remove the residual power.

The device in accordance with the invention advantageously applies to the cooling of fast reactors in which the reactor core comprises N modules cooled by liquid sodium, each module being cooled by sodium pumped during normal operation by the pumps $P_i$ towards the modules $M_i$ and in the event of stoppage of a pump $P_i$ by sodium pumped from the manifold C towards the module M through the pipe $S_i$.

In one preferential embodiment of the invention, the orifice of the pipe $S_i$ which opens into the pipe $K_i$ is placed so as to ensure that the normal (oriented normal) to the plane of said orifice is parallel to the direction of flow of the fluid and directed downstream of the flow produced by the pump $P_i$ within the pipe $K_i$. This arrangement is judicious since no fluid is drawn-off towards the manifold C when all the pumps P are in operation and there is little disturbance in the stream of fluid; but when the pump $P_i$ fails, the fluid which circulates from the manifold C to the pipe $K_i$ through the pipe $S_i$ is preferentially sent in the direction of the module $M_i$ of the reactor core, thereby entraining the fluid which is present within the pipe $K_i$ whereas very little fluid is drawn-off by the other pipes S in order to supply the manifold C.

In order to promote the entrainment just mentioned, it is possible to employ a jet pump or ejector constituted by a pipe $K_i$ in the form of a venturi tube comprising a convergent-divergent structure, the opening of the pipe $S_i$ in the pipe $K_i$ being located substantially in the vicinity of the throat of said venturi tube.

Further properties and advantages of the invention will become more readily apparent from the following description of examples of construction which are given by way of explanation but not in any limiting sense, reference being made to the accompanying drawings in which.

Figure 1:
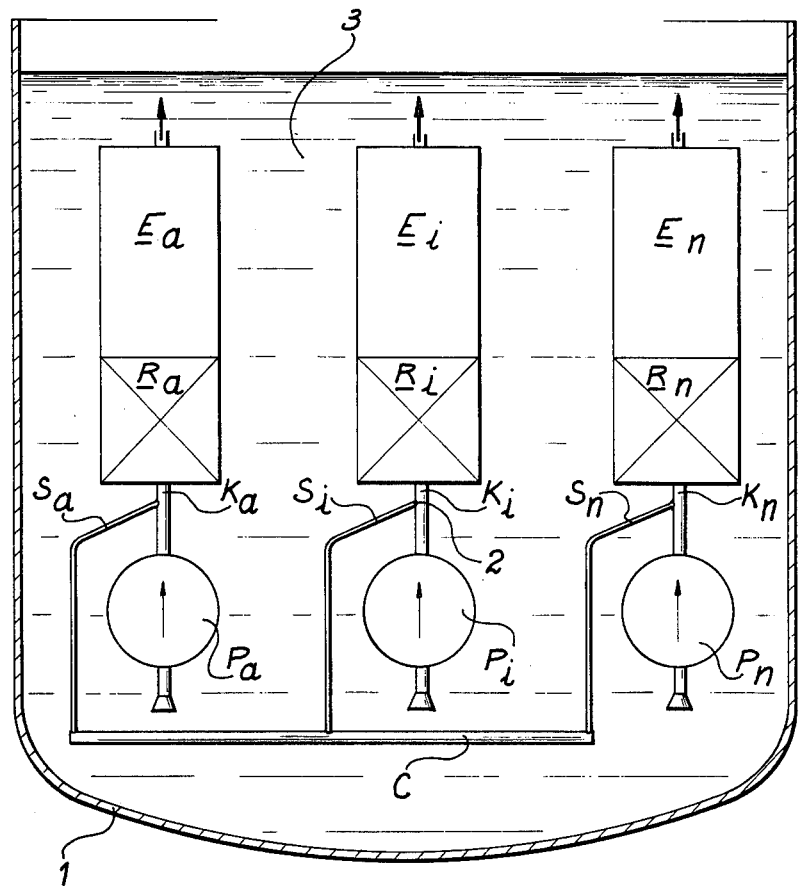
FIG. 1 is a hydraulic diagram of an assembly of N modules.

FIG. 1 shows the hydraulic diagram of an assembly of N modules located within the tank 1 of a reactor which is filled with liquid 3 in the particular case in which the heat exchangers are integrated and located above each core element of the nuclear reactor. Each module is capable of independently maintaining a chain reaction at a constant rate. The heat exchangers $E_i$ are located above each reactor core element. The heat exchangers $E_i$ are located above the modules of the reactor $R_i$ which are supplied with heat-transporting fluid by the pump $P_i$; the manifold C is connected to the pipe $K_i$ located between the pump $P_i$ and the reactor $R_i$ by means of the pipe $S_i$. At the time of stoppage of the pump $P_i$ for example, the control-rod drop reduces the nominal power of the reactor $R_i$ to a considerable extent. There also takes place a pressure drop at the point 2, with the result that the fluid contained in the manifold C is injected through the reactor $R_i$ via the pipe $S_i$. A small proportion of the fluid nevertheless passes through the pump $P_i$ but this parasitic flow is maintained at a value below the rate of flow through the reactor core.

The necessary rate of flow supplied through the manifold to $S_i$ is equal at a maximum to 2% of the nominal flow rate. If the reactor block is equipped with more than three modules, the withdrawal from the modules remaining in service is less than one percent of their nominal flow rate. If the number of modules is at least equal to six, the withdrawal is of minimum value.

Figure 2:
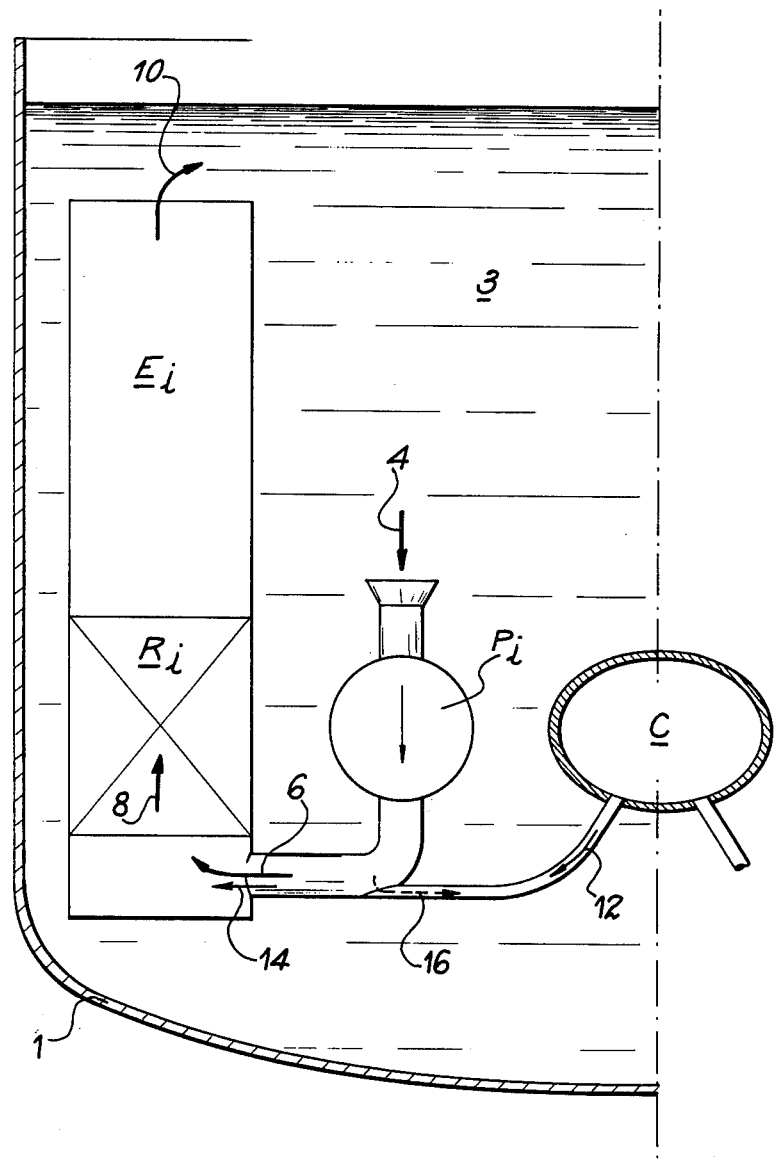
FIG. 2 shows the hydraulic arrangement of the emergency cooling circuit.

The fluid circuit arrangement in accordance with the invention as shown in FIG. 2 comprises the manifold C, the pump $P_i$ associated with the reactor $R_i$ and with the heat exchanger $E_i$. The heat exchanger $E_i$ can be common to all the reactors $R_i$ or alternatively each reactor $R_i$ can be associated with a separate heat exchanger $E_i$. The flow of the primary heat-transporting fluid follows the path indicated by the arrows 4, 6, 8 and 10. When the pump $P_i$ is stopped, the emergency cooling liquid is sent from the manifold C in the direction of the arrows 12 and 14. The arrow 16 indicates the direction of circulation of the heat-transporting fluid in the event of withdrawal for supplying the emergency circuit attached to another pump which is stopped.

Figure 3:
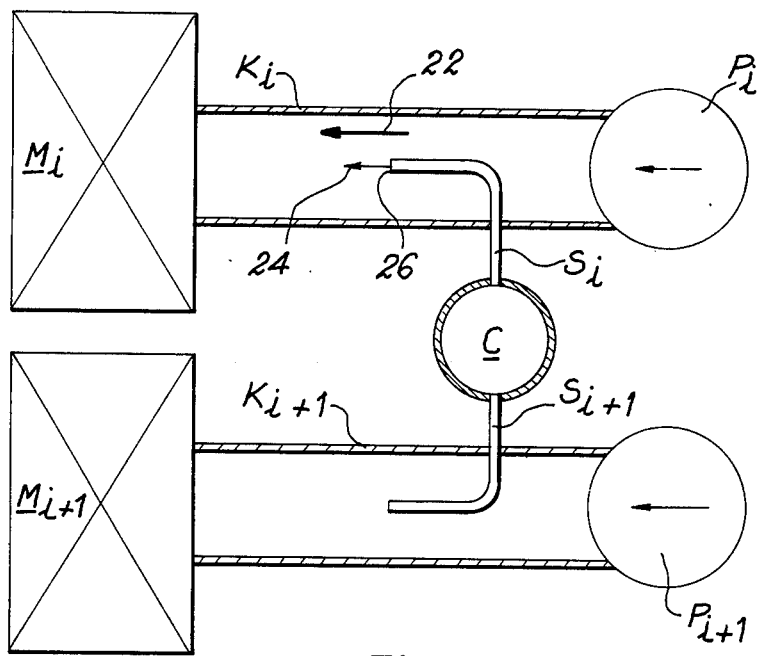
FIG. 3 is a diagrammatic view showing the insertion of the tubes $S_i$ in the pipes $K_i$ which connect the pumps $P_i$ to the associated modules of the nuclear reactor.

There are shown diagrammatically in FIG. 3 two structures in parallel having an index $i$ and an index $i+1$ comprising pumps $P_i$ and $P_{i+1}$ which pass the heat-transporting fluid into the reactor modules $M_i$ and $M_{i+1}$. When the pump $P_i$ is in operation, the fluid such as sodium for example is directed towards the reactor module $M_i$ in the direction of the arrow 22. The orifice 26 of the pipe $S_i$ which penetrates into the pipe $K_i$ is connected to the manifold C so that the axis 24 of the orifice is parallel to the direction of flow 22 of the heat-transporting fluid such as sodium for example and directed downstream.

The geometrical parameters of the device are such that the difference between the static pressure and the dynamic pressure in the heat-transporting fluid is positive, the pressure at the orifice 26 being equal to this difference $P = P_s - P_d$. During operation, the pressure within the manifold C is consequently lower than that which prevails on the suction side of the pumps ($P_s$ and $P_d$ being the values of the effective pressures with respect to said suction pressure). When a failure occurs in a pump such as the pump $P_{i+1}$ for example, the fluid is sent from the manifold C to the pipe $K_{i+1}$ via the pump $S_{i+1}$ towards the reactor module $M_{i+1}$ whereas very little fluid is discharged towards the pump $P_{i+1}$ even if the hydraulic impedance of the pump structure $P_{i+1}$ is lower than that of the module $M_{i+1}$, which makes it possible to avoid the use of a non-return valve or any other type of valve.

In order to prevent pressure drops, the mechanical impedance of the pipes $S_i$ is limited as far as possible in order to ensure that the pressure of the fluid within the manifold is approximately equal to the pressure at the level of the orifice, namely $P_s - P_d$.

Figure 4:
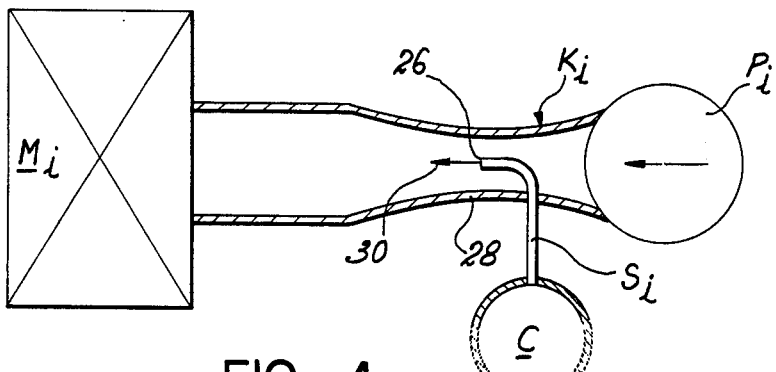
FIG. 4 shows one example of construction in which the pipe $K_i$ has a venturi-tube structure.

There is shown in FIG. 4 an alternative embodiment of the invention in which the pipe $K_i$ has the shape of a venturi tube and in which the orifice 26 of the pipe $S_i$ penetrates into the pipe $K_i$ at the level of the throat 28 of said venturi tube. The venturi portion of the pipe $k_i$ and the pipe $S_i$ constitute a jet pump or ejector which operates in the right direction for ensuring that, when a failure has occurred in the pump $P_i$, the fluid contained in the pipe $K_i$ is entrained under the influence of the jet of liquid which is blown through the pipe $S_i$ into the pipe $K_i$ in the direction of the arrow 30, said liquid being derived from the manifold C which is supplied by all the other pipes S. Said ejector pump operates in reverse at the time of withdrawal of liquid when the pump $P_i$ is in operation. In this embodiment in which the structure of the venturi pipe $k_i$ assists the mechanism of ejection by entrainment produced by a fluid stream projected at the throat, steps are also taken to ensure that the static pressure $P_s$ of the heat-transporting fluid at the time of operation is higher than the dynamic pressure $P_d$ resulting from the directed kinetic energy of the molecules of the heat-transporting fluid. Said ejector pump clearly operates in the right direction when a failure of the pump $P_i$ occurs.

The introduction of the fluid derived from the manifold C through the pipes $S_i$ has been represented in a direction strictly parallel to the stream of fluid produced by the pump $P_i$. It is readily apparent that the scope of the invention includes slight modifications of this configuration in which the fluid blown through the pipe $S_i$ makes a small angle with the flow of fluid (when this latter exists) produced by the pump $P_i$.

What we claim is:

1. An emergency cooling device for a nuclear reactor in which the core is constituted by N independent modules, a heat-transporting fluid being circulated through each module $M_i$ under the action of an associated independent pump $P_i$, wherein said device comprises a manifold C and N pipes $S_i$ ($i=1, 2 \ldots N$), each of the pipes $S_i$ being directly connected between the manifold C and a pipe $K_i$ which directly connects the pump $P_i$ to the module $M_i$ wherein the axis of the orifice of each of the pipes $S_i$ which open into the pipes $k_i$ is substantially parallel to the direction of flow of the fluid within the pipe $K_i$ under the influence of the pump $P_i$ and directed towards the downstream end of said flow.

2. A device according to claim 1, wherein the cross-sectional area of the pipes $S_i$ is within the range of 1/100 and 1/10 of the cross-sectional area of the main pipes $K_i$ which connect the pumps $P_i$ to the modules $M_i$.

3. The application of the device according to claim 1, wherein the reactor core comprises N modules cooled by liquid sodium pumped during normal operation by pumps $P_i$ towards the modules $M_i$ and in the event of stoppage of a pump $P_i$ from the manifold C towards module $M_i$ by means of the pipe $S_i$.

* * * * *